United States Patent
Sayem et al.

(10) Patent No.: US 11,592,577 B2
(45) Date of Patent: Feb. 28, 2023

(54) BEZEL ANTENNA SYSTEM

(71) Applicant: Garmin Switzerland GmbH, Schaffhausen (CH)

(72) Inventors: Abu T. Sayem, Overland Park, KS (US); Juhi H. Godhwani, Lenexa, KS (US); Georgios Atmatzakis, Olathe, KS (US)

(73) Assignee: Garmin Switzerland GmbH

( * ) Notice: Subject to any disclaimer, the term of this patent is extended or adjusted under 35 U.S.C. 154(b) by 0 days.

(21) Appl. No.: 17/821,727

(22) Filed: Aug. 23, 2022

(65) Prior Publication Data
US 2022/0413163 A1 Dec. 29, 2022

Related U.S. Application Data

(63) Continuation of application No. 16/781,691, filed on Feb. 4, 2020, now Pat. No. 11,460,587.

(51) Int. Cl.
*G01S 19/36* (2010.01)
*G01S 19/19* (2010.01)
(Continued)

(52) U.S. Cl.
CPC ............... *G01S 19/36* (2013.01); *G01S 19/19* (2013.01); *H01Q 1/273* (2013.01); *H01Q 1/42* (2013.01); *H01Q 5/307* (2015.01)

(58) Field of Classification Search
CPC ......... G01S 19/36; G01S 19/19; H01Q 5/307; H01Q 1/273; H01Q 1/42
(Continued)

(56) References Cited

U.S. PATENT DOCUMENTS

| 9,397,727 B1* | 7/2016 | Mattsson ............ H04B 5/0081 |
| 10,271,299 B1 | 4/2019 | Sayem et al. |

(Continued)

FOREIGN PATENT DOCUMENTS

| CN | 107706548 A | 2/2018 | |
| CN | 208738415 U * | 4/2019 | ............. G04G 17/04 |

(Continued)

OTHER PUBLICATIONS

PCT Patent Application PCT/US2019/036231 International Search Report and Written Opinion dated Oct. 14, 2019.
(Continued)

*Primary Examiner* — Harry K Liu
(74) *Attorney, Agent, or Firm* — Samuel M. Korte; Max M. Ali

(57) ABSTRACT

A wrist-worn electronic device comprises a housing, a bezel, a location determining element, a communication element, and four antennas. The housing includes a bottom wall contacting a wearer's wrist and a side wall coupled to the bottom wall. The bezel is formed at least partially from electrically conductive material and positioned along an upper edge of the side wall. Two antennas receive a first global navigation satellite system (GNSS) location signals at a first frequency and a second frequency that are used by the location determining element, each antenna including a radiating element formed by a portion of the circumference of the bezel. Two antennas transmit or receive communication protocol wireless signals at a third frequency and a fourth frequency output by or communicated to the communication element, each antenna including a radiating element formed by a portion of the circumference of the bezel.

20 Claims, 11 Drawing Sheets

(51) Int. Cl.
*H01Q 1/27* (2006.01)
*H01Q 1/42* (2006.01)
*H01Q 5/307* (2015.01)

(58) Field of Classification Search
USPC .................................................. 342/357.72
See application file for complete search history.

(56) References Cited

U.S. PATENT DOCUMENTS

| | | |
|---|---|---|
| 10,276,925 B2 | 4/2019 | Han et al. |
| 10,484,958 B2 | 11/2019 | Sayem et al. |
| 10,581,145 B2 | 3/2020 | Han et al. |
| 2013/0169494 A1 | 7/2013 | Hung et al. |
| 2014/0225786 A1 | 8/2014 | Lyons et al. |
| 2016/0099497 A1 | 4/2016 | Lee et al. |
| 2016/0344439 A1 | 11/2016 | Seol et al. |
| 2016/0352014 A1 | 12/2016 | Chen et al. |
| 2017/0040701 A1 | 2/2017 | Hanabusa |
| 2017/0214422 A1 | 7/2017 | Na et al. |
| 2018/0239308 A1* | 8/2018 | Yamamoto ............. G04R 60/10 |
| 2019/0245271 A1* | 8/2019 | Varjonen ............. H05K 7/1427 |
| 2019/0379122 A1 | 12/2019 | Kenkel et al. |
| 2021/0239847 A1 | 8/2021 | Sayem et al. |

FOREIGN PATENT DOCUMENTS

| | | | | |
|---|---|---|---|---|
| CN | 208738415 U | | 4/2019 | |
| GB | 2570905 A | * | 8/2019 | ............. G01S 19/36 |
| GB | 2570905 A | | 8/2019 | |
| JP | 2021193803 A | * | 12/2021 | ........... G04B 37/225 |
| JP | 2021193803 A | | 12/2021 | |
| KR | 20180050151 A | | 5/2018 | |

OTHER PUBLICATIONS

PCT Patent Application PCT/US2019/036235 International Search Report and Written Opinion, dated Oct. 1, 2019.
Printout from https://www.lg.com/us/cell-phones/lg-LMG820UM1-att-g8-thinq, published prior to Feb. 4, 2020.
Printout from https://www.oneplus.eom/7pro#/, published prior to Feb. 4, 2020.
Printout from https://www.qualcomm.com/products/snapdragon-855-mobile-platform, published prior to Feb. 4, 2020.
Printout from https://www.samsung.com/us/smartphones/galaxy-s10/certified-pre-owned-store/buy/?modelCode=SM5G973UZKAATT#benefits, published prior to Feb. 4, 2020.
Printout from https://www.techradar.com/reviews/huawei-mate-20-pro-review, published prior to Feb. 4, 2020.

* cited by examiner

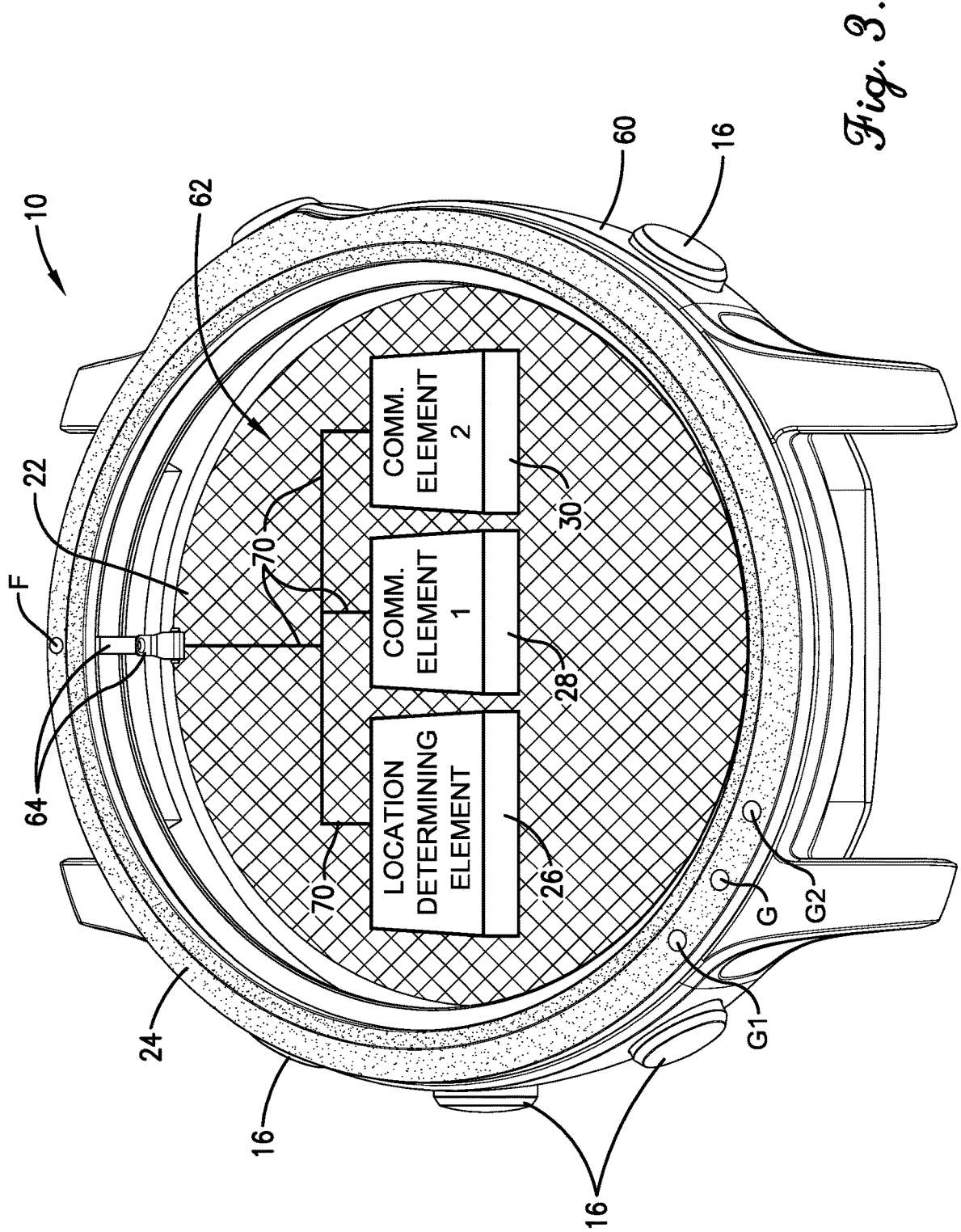

BEZEL ANTENNA SYSTEM

RELATED APPLICATIONS

The present application is a continuation of, and claims priority benefit to, co-pending and commonly assigned U.S. Non-Provisional patent application Ser. No. 16/781,691, filed on Feb. 4, 2020, and entitled, "BEZEL ANTENNA SYSTEM." The contents of the above-mentioned patent application are incorporated herein by reference in their entirety.

BACKGROUND

A wrist-worn electronic device is typically utilized by people who are walking, jogging, running, biking, hiking, backpacking, camping, mountain climbing, geocaching, or the like. Such electronic devices typically include an antenna, a location determining element, and a screen. The antenna receives one or more location signals, such as global navigation satellite system (GNSS) location signals, and communicates the received signals to a location determining element that processes the location signals in order to determine a geolocation of the electronic device. The screen may display information, such as the determined geolocation on a map, on a user interface presented to the user. It is generally understood that a more accurate determination of the user's current location may be made by the location determining element based on location signals output by satellite systems using two or more frequency bands. For example, the location determining element may more accurately determine a current geolocation of the device based on GNSS signals output on two frequency bands, such as the L1 and L5 bands for GPS, than a determination based on only one of the two bands.

SUMMARY

Embodiments of the present technology provide a wrist-worn electronic device with a multiple frequency band antenna configuration that improves the accuracy of the determination of a geolocation of the electronic device. The electronic device broadly comprises a housing, a bezel, a first frequency band antenna, a second frequency band antenna, and a location determining element. The housing includes a bottom wall configured to contact a wearer's wrist and one or more side walls coupled to the bottom wall. The bezel is formed at least partially from electrically conductive material and positioned along an upper edge of the side wall such that the combination of the bottom wall, the one or more side walls and the bezel form an internal cavity of the housing. The first frequency band antenna is configured to receive a first global navigation satellite system (GNSS) wireless signal at a first frequency within a first frequency band. The first frequency band antenna includes a radiating element formed by a first portion of a circumference of the bezel. The second frequency band antenna is configured to receive a second GNSS wireless signal at a second frequency. The second frequency band antenna includes a radiating element formed by a second portion of the circumference of the bezel. The location determining element is configured to determine a current geolocation of the wrist-worn electronic device based on the first GNSS wireless signal and the second GNSS wireless signal received from the first and second frequency band antennas.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 3 is a top perspective view of the wrist-worn electronic device with the display removed to reveal a printed circuit board and at least one electrical connection from the printed circuit board to the bezel;

Figure 1B:
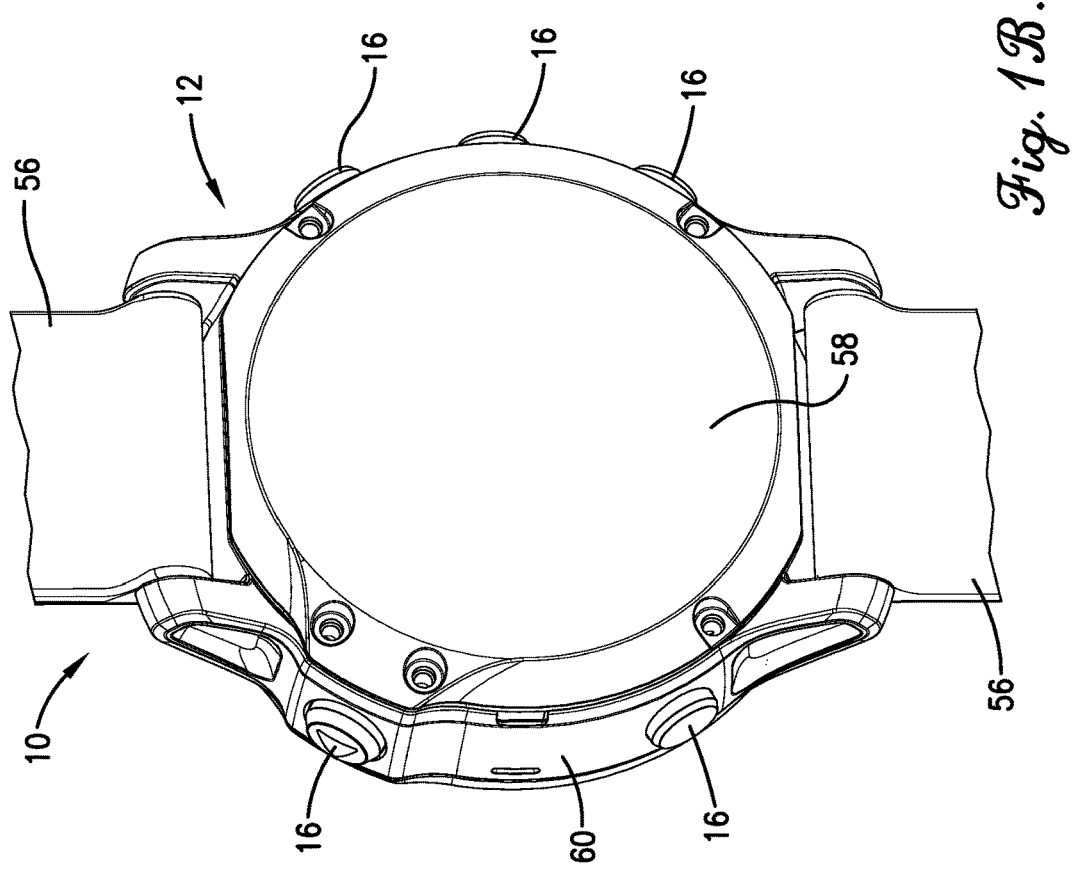
FIGS. 1A and 1B are a front and a rear perspective view of a wrist-worn electronic device, constructed in accordance with embodiments of the present technology, featuring a housing with a display and a surrounding bezel incorporating a multiple frequency band antenna configuration.

The drawing figures do not limit the present technology to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

Embodiments of the present technology relate to an electronic device that can be worn on a user's wrist and includes a multi frequency band antenna configuration that utilizes a bezel on a housing to form a plurality of antennas having different resonant frequencies that enable the electronic device to receive a plurality of signals or communicate wirelessly with other devices and remote systems, and networks. The electronic device may be embodied by a fitness watch, a wrist-worn smart phone, a wrist-worn navigation device, or other wearable multi-function electronic devices that include a housing and a wrist band, strap, or other attachment mechanism. Although the electronic device is typically worn on a wrist, it may also be worn on other parts of a user's body such as the forearm or the upper arm. The electronic device may include a location determining component processing element that may receive location signals (output by a satellite-based positioning system, such as the global navigation satellite system (GNSS)) from the antennas formed at least partially by the bezel and determine a geolocation of the electronic device. A processing element may receive and use the determined geolocation to monitor the user's current location, distance traveled, velocity, and other performance metrics by receiving location signals. The electronic device may be electronically paired with other devices, such as a heart rate monitor worn around the user's chest, a foot pod attached to the user's shoe for measuring jogging or running cadence and distance, a bike speed and cadence sensor attached to a crank arm and wheel hub of the user's bicycle for tracking biking performance, and so forth. Furthermore, the electronic device may be able to communicate with smartphones, tablets, laptop or desktop computers, Wi-Fi routers, cell towers, and the like to allow the user to upload activity data, download apps, download or stream music, receive text messages, emails, and weather alerts, and so on. Thus, the electronic device may utilize or process signals with GNSS protocols, Bluetooth™, Wi-Fi, or cellular protocols, and so forth.

The electronic device includes a first frequency band antenna configured to receive a first location signal on a first frequency band and a second frequency band antenna configured to receive a second location signal on a second frequency band. An exemplary first frequency band is the GPS L5 band with a center frequency of approximately 1176.45 megahertz (MHz). An exemplary second frequency band is the GPS L1 band with a center frequency of approximately 1575.42 MHz. However, it is to be understood that the techniques disclosed herein may be applied to other first and second frequency bands. For example, the first frequency band may be the GPS L2 band with a center frequency of approximately 1227 MHz and the second frequency band may be the GPS L1 band with a center frequency of approximately 1575.42 MHz. Similarly, the first frequency band may be the GPS L5 band with a center frequency of approximately 1176.45 MHz and the second frequency band may be the GLONASS L1 band with a center frequency of approximately 1602 MHz. Similarly, the first frequency band may be the GPS L5 band with a center frequency of approximately 1176.45 MHz and the second frequency band may be an Iridium band with a center frequency of approximately 1621.25 MHz. Similarly, the first frequency band may be the GLONASS L2 band with a center frequency of approximately 1246 MHz and the second frequency band may be the GPS L1 band with a center frequency of approximately 1575.42 MHz. Similarly, the first frequency band may be the GLONASS L2 band with a center frequency of approximately 1246 MHz and the second frequency band may be the GLONASS L1 band with a center frequency of approximately 1602 MHz.

In embodiments, the electronic device includes a first frequency band antenna configured to receive a global positioning system (GPS) L1 band location signal and a second frequency band antenna configured to receive a GPS L5 band location signal. The electronic device may further include a third frequency band antenna configured to transmit and receive a 2.4 gigahertz (GHz) frequency band wireless signal and a fourth frequency band antenna configured to transmit and receive a 5 GHz frequency band wireless signal.

In some embodiments, each of the antennas is partially formed by a respective portion of a circumference of the bezel. In other embodiments, two or more of the antennas may partially overlap such that the two or more of the antennas may share a signal feed (F) located at a first point on the bezel and extend to ground points that are radially separated on the bezel. Given the exemplary configuration of the antennas, the electronic device is able to receive location signals and communicate with other devices or remote systems using a variety of communication protocols. Furthermore, in some embodiments, the antennas may be reconfigured to receive location signals on other frequency bands (for the current or other GNSS satellite systems) and/or to transmit and receive wireless signals at other frequency bands.

Figure 6A:
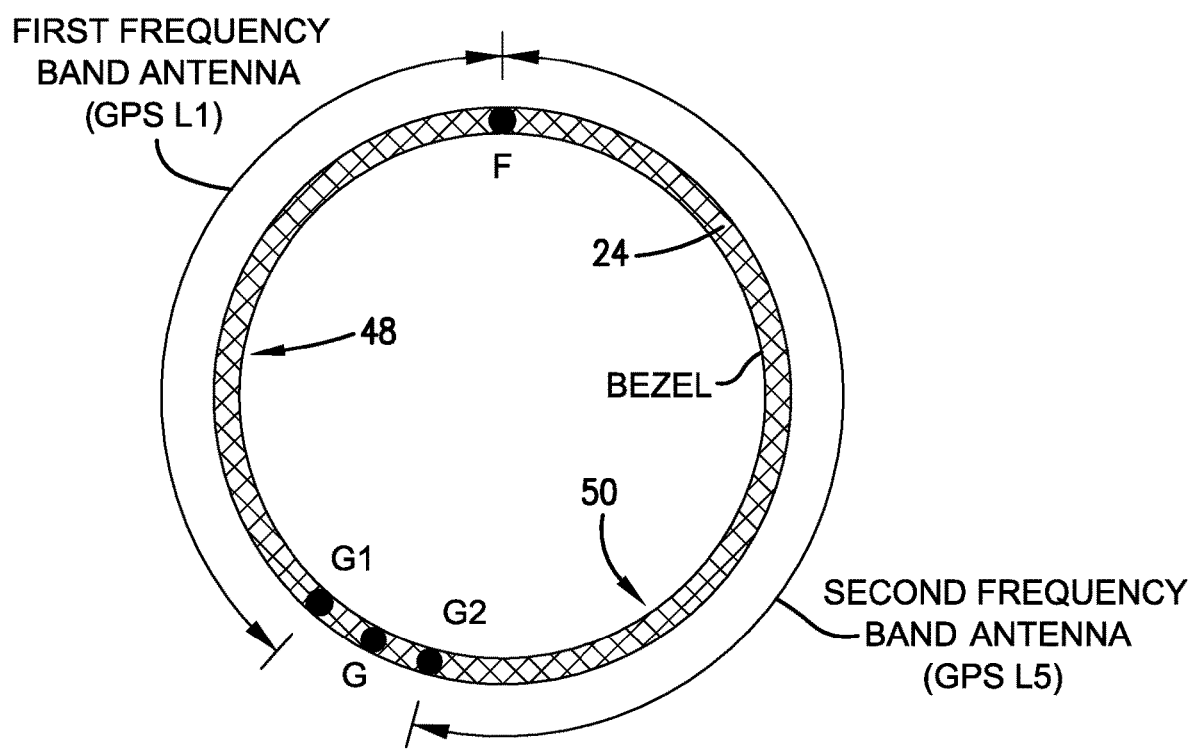
FIGS. 6A-6C are schematic views of embodiments of the multiple frequency band antenna configuration, illustrating a portion of the circumference of the bezel occupied by each antenna.
Figure 6B:
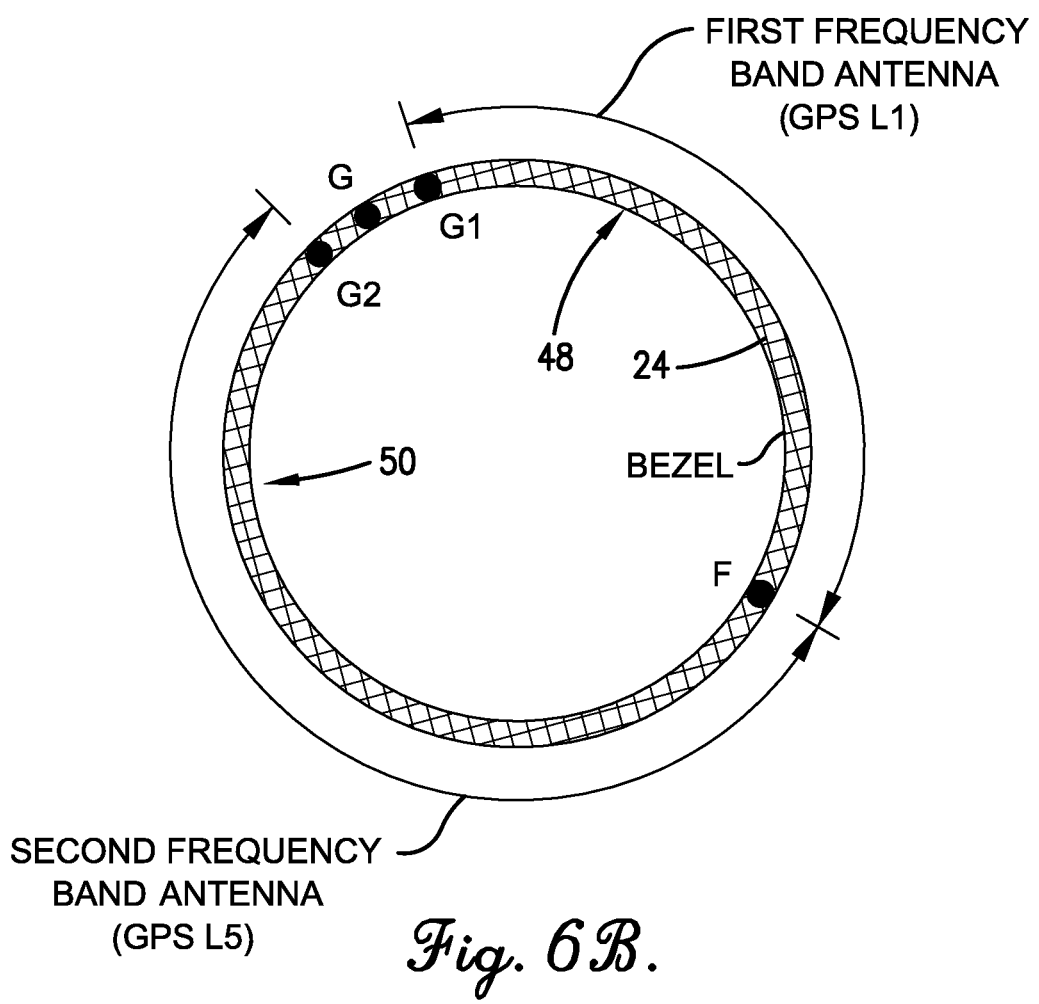
Figure 6C:
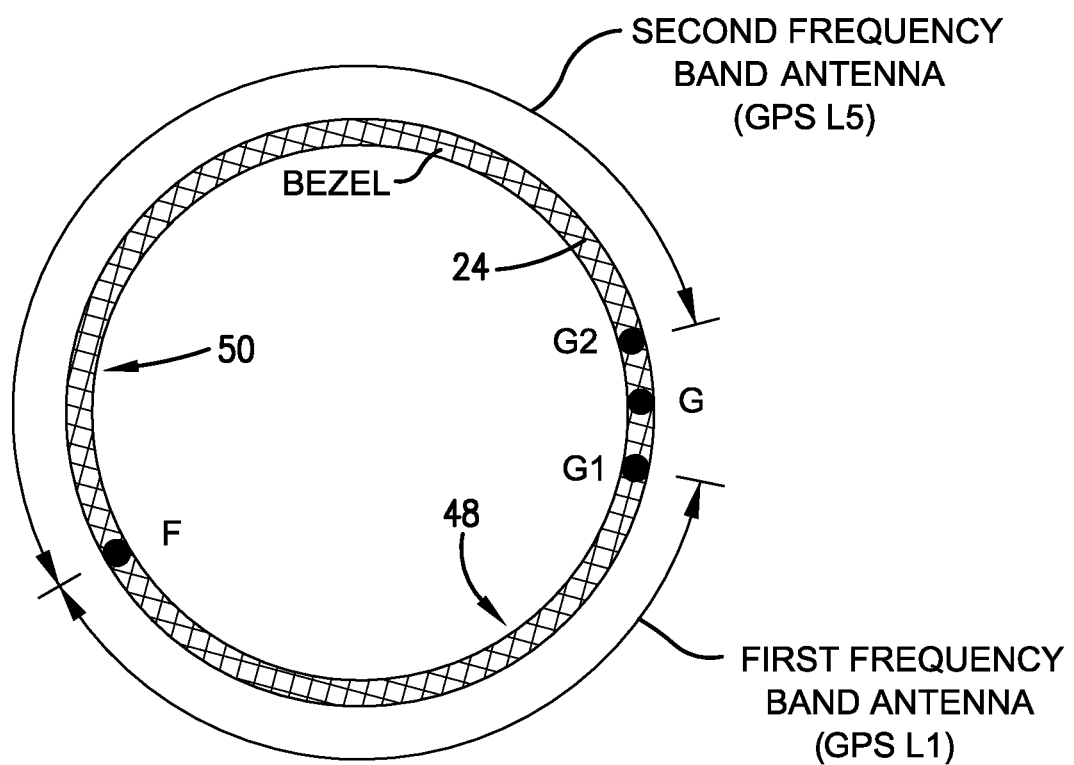

It is to be understood that embodiments of the present invention may utilize different locations along the circumference of the bezel (and corresponding locations of a printed circuit board) as well as difference configurations utilizing separate signal feeds for the two or more antennas. For instance, as shown in FIGS. 6A-6C, a first point on the bezel at which signal feed (F) is positioned may correspond to any location of the bezel, including, but not limited to, a position corresponding to approximately a zero-degree point associated with twelve o'clock (12:00) on a traditional watch dial (when positioned upright and viewing an opening of the bezel within which a display may be positioned), 120 degrees in a clockwise direction from the zero-degree point and associated with four o'clock (4:00) on a traditional watch dial, or 240 degrees in a clockwise direction from the zero-degree point and associated with eight o'clock (8:00) on a traditional watch dial. Similarly, although the first frequency band antenna extends in a counterclockwise direction from the signal feed (F) and the seconds frequency band antenna extends in a clockwise direction from the signal feed (F) in configurations of the first embodiment, the first frequency band antenna may extend in a clockwise direction from the signal feed (F) and the seconds frequency band antenna may extend in a counterclockwise direction from the signal feed (F) in other configurations.

Embodiments of the technology will now be described in more detail with reference to the drawing figures. Referring initially to FIGS. 1-8, a wrist-worn electronic device 10 is illustrated. The electronic device 10 broadly comprises a housing 12, a display 14, a user interface 16, a memory element 18, a processing element 20, a printed circuit board 22, a bezel 24, a location determining element 26, a first communication element 28, a second communication element 30, a first aperture tuning network 32, a second aperture tuning network 34, a third aperture tuning network 36, a fourth aperture tuning network 38, a first switch 40, a second switch 42, a third switch 44, a fourth switch 46, a first frequency band antenna 48, a second frequency band antenna 50, a third frequency band antenna 52, and a fourth frequency band antenna 54. The electronic device 10 may also include a wrist band 56, a strap, or other attachment mechanisms.

Relational terms, such as "upper", "lower", "top", "bottom", "outer", "inner", etc., may be used throughout this description. These terms are used with reference to embodiments of the technology and the orientations thereof shown in the accompanying figures. Embodiments of the technology may be oriented in ways other than those shown in the figures. Therefore, the terms do not limit the scope of the present technology.

Figure 1A:
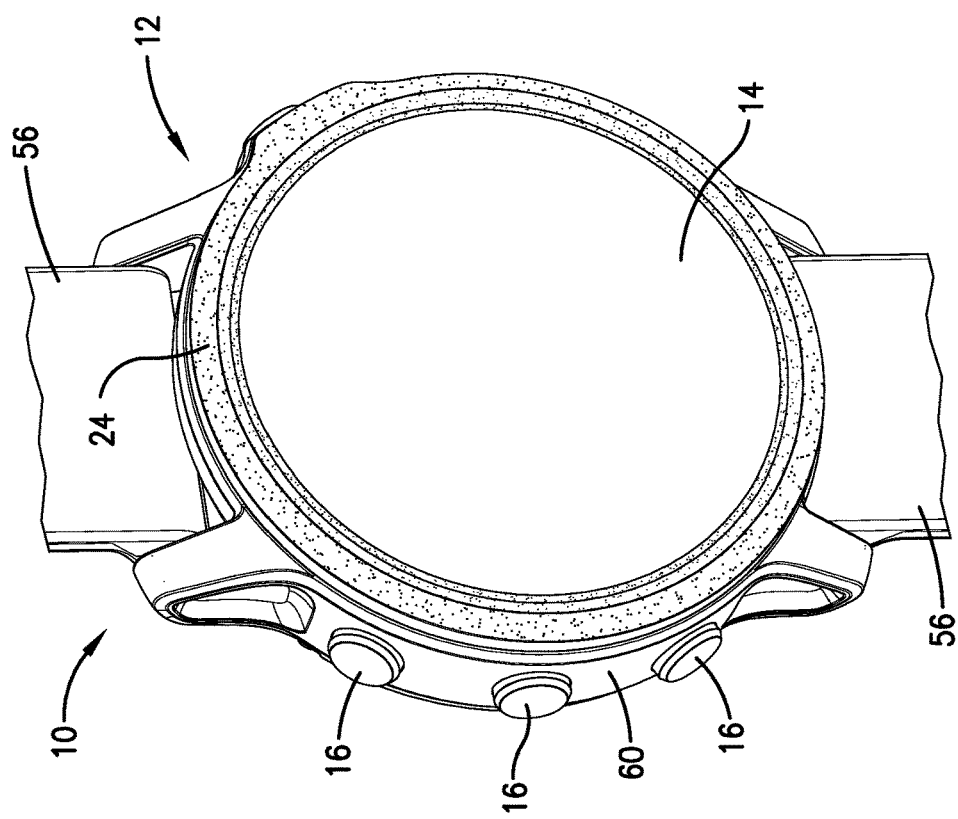

The housing 12, as shown in FIGS. 1A and 1B, generally houses or retains other components of the electronic device 10 and may include or be coupled to the wrist band 56. The housing 12 may include a bottom wall 58, at least one side wall 60, and an internal cavity 62 formed by the bottom wall 58 and the at least one side wall 60. The bottom wall 58 includes a lower, outer surface that contacts the user's wrist while the user is wearing the electronic device 10. The side wall 60 couples to the bottom wall 58 at a lower edge of the side wall 60.

In exemplary embodiments that are shown in the figures, the housing 12 includes a single, continuous side wall 60, with inner and outer surfaces, that forms a circular or ring shape which generally forms a hollow cylinder. In other embodiments, the side wall 60 may have an oval or elliptical shape. In other embodiments, the housing 12 may include a plurality of side walls which form one of a plurality of geometric or polygonal shapes, such as triangular, square or rectangular, hexagonal, octagonal, and so forth. In various embodiments, the side wall 60 may include a plurality of through holes, each of which passes from the outer surface to the inner surface.

The display 14, as shown in FIG. 1, generally presents the information mentioned above, such as time of day, current location, and the like. The display 14 may be implemented in one of the following technologies: light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. In exemplary embodiments that are shown in the figures, the display 14 has a round or circular shape. In general, the display 14 may possess a shape that corresponds to the shape formed by the side wall 60 of the housing 12. The outer edges or perimeter of the display 14 may couple to the side wall 60. In some embodiments, the display 14 may further include a lens overlying the viewing area, which may enhance the visibility of the information shown on the display 14. In various embodiments, the display 14 may also include a touch screen occupying the entire screen or a portion thereof so that the display 14 functions as part of the user interface 16. The touch screen may allow the user to interact with the electronic device 10 by physically touching, swiping, or gesturing on areas of the screen. The display 14 may be in electronic communication with the memory element 18 and the processing element 20 and may receive data or information therefrom that is to be shown on the display 14.

The user interface 16 generally allows the user to directly interact with the electronic device 10 and may include pushbuttons, rotating knobs, or the like. In exemplary embodiments of FIGS. 1A and 1B, the housing 12 may include one or more pushbuttons located in the through holes of the side wall 60 that function as at least a portion of the user interface 16. In various embodiments, the display 14 may include a touch screen occupying the entire display 14, or a portion thereof, so that the display 14 functions as at least a portion of the user interface 16. The touch screen may allow the user to interact with the electronic device 10 by physically touching, swiping, or gesturing on areas of the display 14.

The memory element 18 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 18 may be embedded in, or packaged in the same package as, the processing element 20. The memory element 18 may include, or may constitute, a non-transitory "computer-readable medium". The memory element 18 may store the instructions, code, code statements, code segments, software, firmware, programs, applications, apps, services, daemons, or the like that are executed by the processing element 20. The memory element 18 may also store data that is received by the processing element 20 or the device in which the processing element 20 is implemented. The processing element 20 may further store data or intermediate results generated during processing, calculations, and/or computations as well as data or final results after processing, calculations, and/or computations. In addition, the memory element 18 may store settings, data, documents, sound files, photographs, movies, images, databases, and the like.

The processing element 20 may comprise one or more processors. The processing element 20 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 20 may generally execute, process, or run instructions, code, code segments, code statements, software, firmware, programs, applications, apps, processes, services, daemons, or the like. The processing element 20 may also include hardware components such as registers, finite-state machines, sequential and combinational logic, and other electronic circuits that can perform the functions necessary for the operation of the current invention. In certain embodiments, the processing element 20 may include multiple computational components and functional blocks that are packaged separately but function as a single unit. The processing element 20 may be in electronic communication with the other electronic components through serial or parallel links that include universal busses, address busses, data busses, control lines, and the like.

Figure 2A:
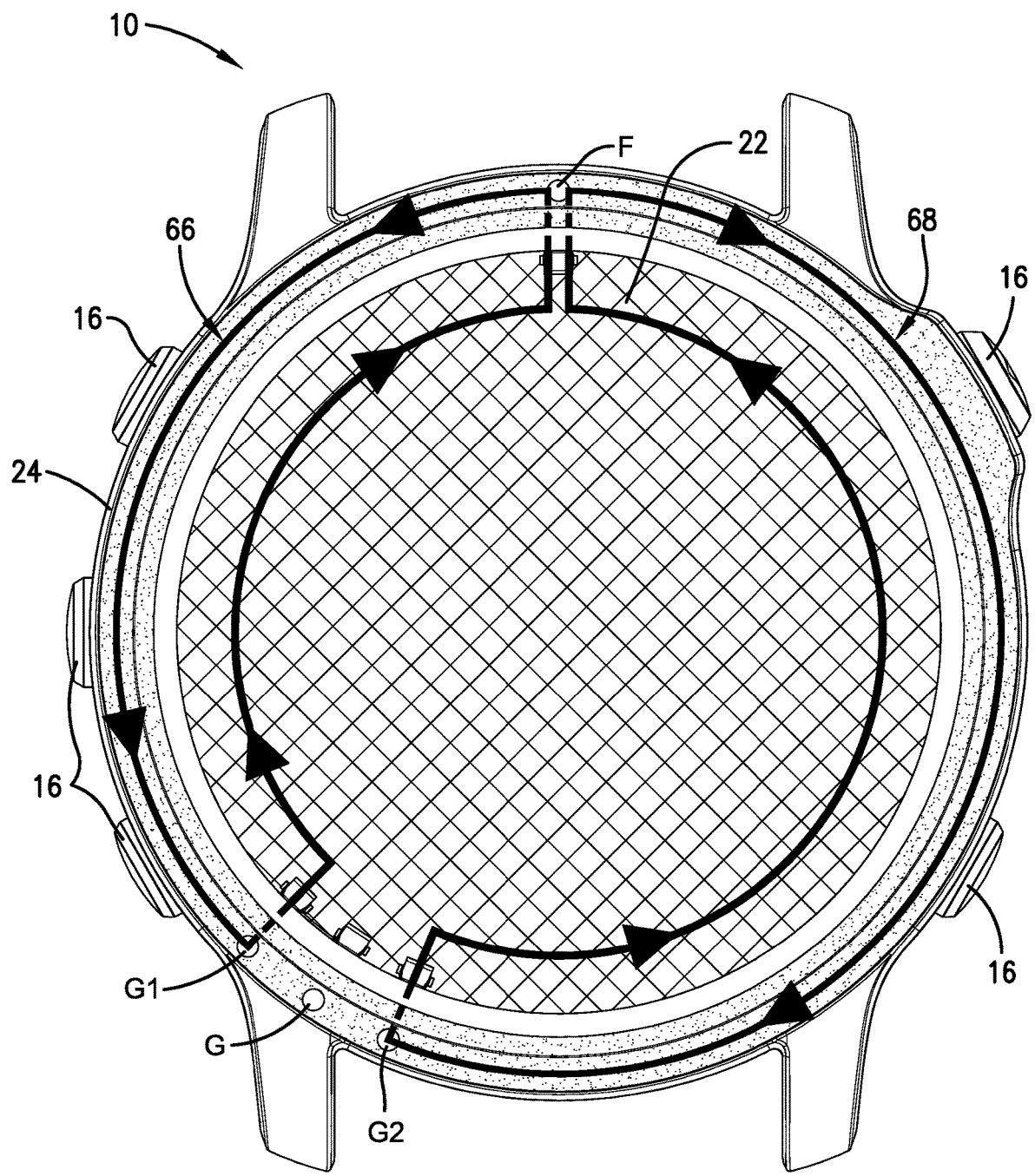
FIGS. 2A and 2B is a top view and a partially rotated view of the bezel and a printed circuit illustrating at least a portion of the components that form a first frequency band antenna and a second frequency band antenna of the wrist-worn electronic device.
Figure 2B:
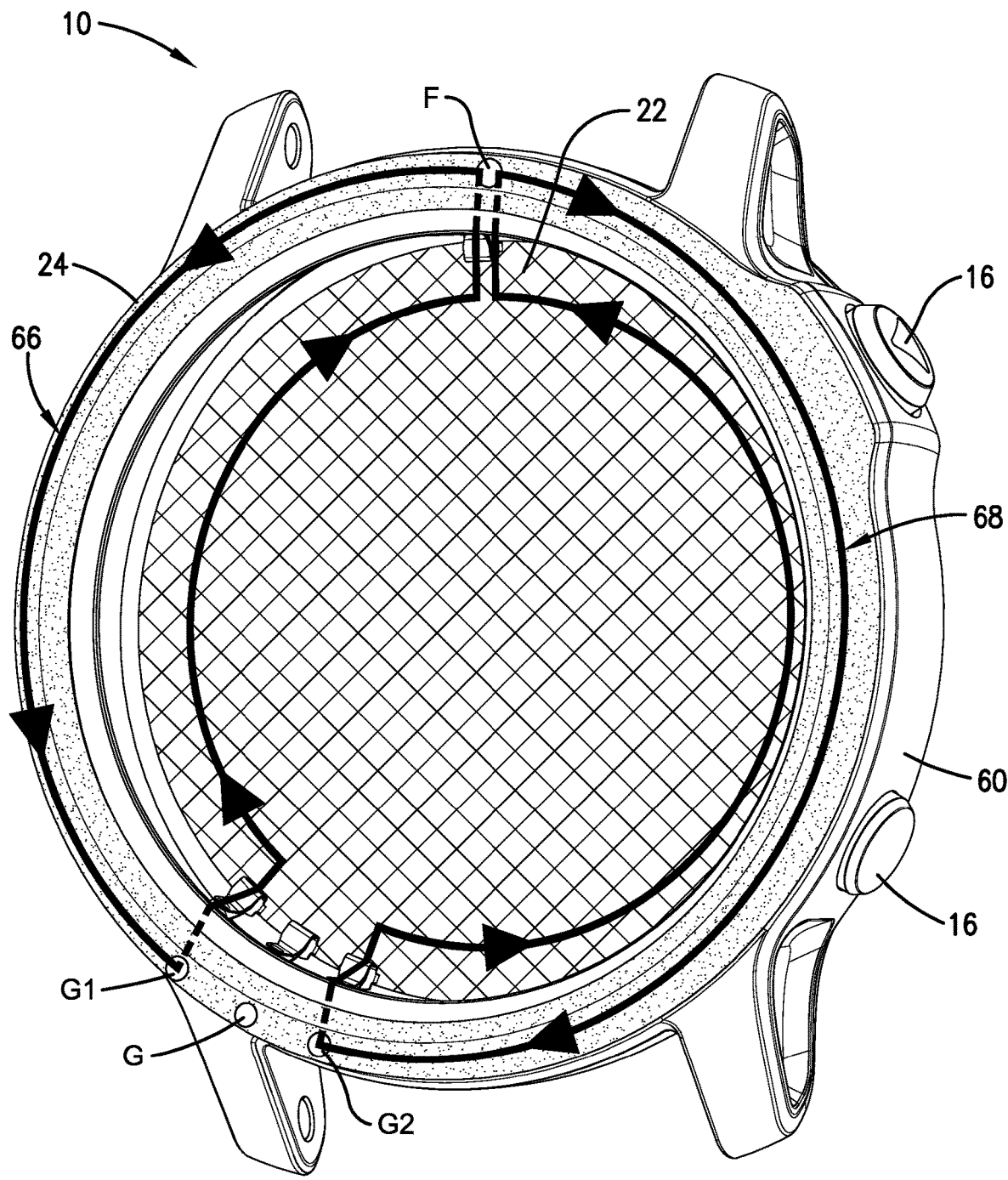

The printed circuit board 22, as shown in FIGS. 2A-2B and 3, generally contains a reference ground plane for all antennas in system 10 as well as retains and provides a substrate and signal traces 70 for supplying electric power to, and electronic communication between, the electronic components of electronic device 10, such as the location determining element 26 and the communication elements 28, 30, through signal traces 70. The signal traces 70 on or within printed circuit board 22 provide electrical pathways enabling electronic communication with the memory element 18, the processing element 20, the aperture tuning networks 32, 34, 36, 38, and the switches 40, 42, 44, 46, among others. The printed circuit board 22 may be constructed with a first, or top, surface and an opposing second, or bottom, surface. The printed circuit board 22 may also include multiple electrically conductive layers with a top conductive layer placed on the first surface, a bottom conductive layer placed on the second surface, one or more inner conductive layers positioned between the first and second surfaces, and an insulating layer between each pair of adjacent conductive layers. The insulating layers may be formed from rigidized material that includes various combinations of fiberglass, woven glass, matte glass, cotton paper, phenolic cotton paper, polyester, epoxies, epoxy resins, and the like. The conductive layers may be formed from metals typically including copper, but also including nickel, aluminum, gold, silver, palladium, zinc, tin, lead, and the like. Each conductive layer may include one or more electrically conductive traces 70. The conductive traces 70 may be utilized to communicate electronic signals or may be electrically coupled to electric power or ground. Each conductive layer may additionally or alternatively include one or more signal, power, or ground pads or terminals, full or partial electric power planes, or full or partial electric ground planes. In addition, the printed circuit board 22 may include plated through hole vias, blind vias, buried vias, and the like. The electronic components may be implemented in packages which are mounted, or retained, on the top surface, the bottom surface, or both surfaces. The electronic components may communicate with one another through electrically conductive signal traces 70.

The electronic device 10 may further include a plurality of electrically conductive elements 64 that provide electrical connections between the printed circuit board 22 and the bezel 24, directly or indirectly through the side wall 60. The electrically conductive elements 64 electrically couple and may provide electrical connection(s) for electronic signals and electronic ground. Each electrically conductive element 64 is formed from or includes electrically conductive material, such as various metals or metal alloys. The electrically conductive elements 64 may be embodied by pogo pins, wires, jumpers, posts, flexible conductors, conductive ribbons, clamp and/or spring structures, or the like, or combinations thereof. Each electrically conductive element 64 may electrically couple to the printed circuit board 22 on the top or bottom surface, with a via through the printed circuit board 22, at the edge of the printed circuit board 22, or combinations thereof.

The bezel 24, as seen in FIGS. 1-3 and 6-8, may be positioned along an upper edge of the side wall 60 of the housing 12 and may generally cover the perimeter edges of the display 14 or encircle the display 14. The bezel 24 may be shaped to conform to the shapes of a circular or oval housing 12 and display 14 such that the bezel 24 may be positioned between the perimeters of the housing 12 and the display 14. The bezel 24 may have an inner edge with dimensions that are smaller than or approximately equal to the perimeter dimensions of the display 14 and an outer edge with dimensions that are approximately equal to the perimeter dimensions of the upper surface of the housing 12. Thus, the bezel 24 may be circular, square, or rectangular with a central opening through which the display 14 may be viewed, although in the exemplary embodiments shown in the figures, the bezel 24 may have an annular shape.

The bezel 24 may be formed from electrically conductive metallic material (or any material that may integrate an electrically conductive metallic or semi-metallic material) and may be positioned on or fixedly attached to an outer surface of the side wall 60 of housing 12. In embodiments, the bezel 24 may incorporate a non-conductive material, such as plastic, in one or more portions of the bezel 24 to electrically isolate a first portion of bezel 24 from a second portion of bezel 24. For instance, one or more plastic inserts having a similar cross-sectional shape as the bezel 24 may be positioned between the first portion of bezel 24 from the second portion of bezel 24 for the electrical isolation of those two portions of bezel 24. In some embodiments, the bezel 24 may be able to rotate in place, roughly around the center of the upper surface of the housing 12. In other embodiments, the bezel 24 may be firmly attached to the upper surface and may not rotate. In certain embodiments, the bezel 24 may be integral to the housing 12. For example, the bezel 24 may be a raised or flush portion of the housing 12.

The first frequency band antenna 48 and the second frequency band antenna 50 may be configured as loop antennas, each forming a signal path from a signal feed (F) located at a first point on the bezel 24, such as a position corresponding to approximately 12:00 on a watch dial, and extend to ground points that are radially separated on the bezel 24. As shown in FIGS. 2A-2B, which are not drawn to scale, a first signal path 66 associated the first frequency band antenna 48 may extend from a first electrically conductive element 64a positioned on printed circuit board 22, ascend vertically through the first electrically conductive element 64a to the first point on a lower surface of the bezel 24, continue in a counter-clockwise direction from the first point to a first electronic ground point (G1) to a second point on the lower surface of the bezel 24, descend vertically through a second electrically conductive element 64b positioned on printed circuit board 22 proximate to the second point on the lower surface of the bezel 24, and continue in a clockwise direction along a perimeter of the printed circuit board 22 from the second electrically conductive element 64b to the first electrically conductive element 64a, thereby forming a loop. Similarly, a second signal path 68 of the second frequency band antenna 50 may extend from a first electrically conductive element 64a positioned on printed circuit board 22, ascend vertically through the first electrically conductive element 64a to the first point on a lower surface of the bezel 24, continue in a clockwise direction from the first point to a second electronic ground point (G2) to a third point on the lower surface of the bezel 24, descend vertically through a third electrically conductive element 64c positioned on printed circuit board 22 proximate to the third point on the lower surface of the bezel 24, and continue in a counter-clockwise direction along a perimeter of the printed circuit board 22 from the third electrically conductive element 64c to the first electrically conductive element 64a, thereby forming a loop separate from the first signal path 64 associated with the first frequency band antenna 48.

The location determining element 26 determines a current geolocation of the electronic device 10 and may receive and process radio frequency (RF) wireless signals, such as wireless location signals, from a multi-constellation global navigation satellite system (GNSS) such as the global positioning system (GPS) utilized in the United States, the GLONASS system utilized in Russia, the Galileo system utilized in Europe, or the like. The location determining element 26 may include satellite navigation receivers, processors, controllers, other computing devices, or combinations thereof, and memory. The location determining element 26 receives and processes a first electronic location signal from the first frequency band antenna 48 and a second electronic location signal from the second frequency band antenna 50. The first electronic location signal includes data and information output by a GPS satellite on the GPS L1 band, which has a center frequency of 1575.42 MHz. The second electronic location signal includes data and information output by a GPS satellite on the GPS L5 band, which has a center frequency of 1176.45 MHz. Conventional location determining elements receive and use the data and information provided by location signals output by GPS satellites on the GPS L1 band to determine a current geolocation (including coordinates, such as the latitude and longitude) of an electronic device within which an antenna(s) and the location determining element is located.

When the location determining element 26 receives the data and information received on both the GPS L1 band and the GPS L5 band, the location determining element 26 of the current technology determines the current geolocation of the electronic device 10 with greater accuracy than by utilizing data and information received on the GPS L1 band alone. The location determining element 26 may communicate the determined current geolocation to the processing element 20, the memory element 18, or both. Although the location determining element 26 of the current technology receives and utilizes data and information received on multiple GPS frequency bands, it is to be understood that the current technology disclosed herein apply to a location determining element 26 configured to receive and utilize data and information from two or more frequency bands associated with other GNSS constellations, such as GLONASS or Galileo, and a location determining element 26 configured to receive and utilize data and information from one or more frequency bands associated with GPS and one or more bands associated with other GNSS constellations, such as GLONASS or Galileo.

The first communication element 28 and the second communication element 30 each process an electronic signal that allows the electronic device 10 to communicate with other electronic devices and remote, external systems, networks, and the like. The communication elements 28, 30 each may include signal and/or data transmitting and receiving circuits, such as amplifiers, filters, mixers, oscillators, digital signal processors (DSPs), and the like that process radio frequency (RF) electronic signals which include data transmitted and received using various communication standards.

Figure 4:
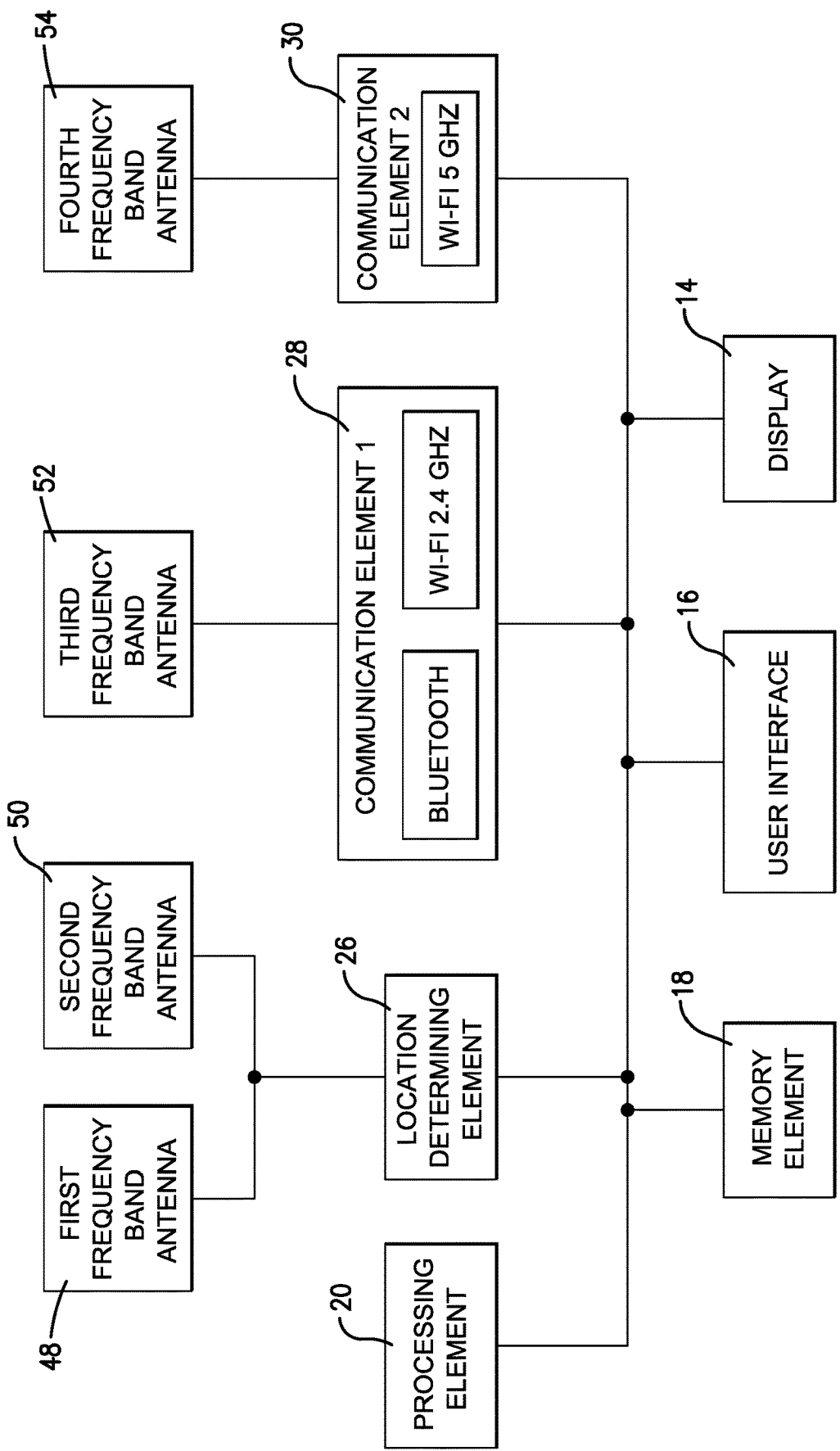
FIG. 4 is a schematic block diagram of various electronic components of the wrist-worn electronic device.

For instance, the first communication element 28 may transmit and/or receive a first electronic communication signal with a frequency component ranging from approximately 2.40 gigahertz (GHz) to approximately 2.4835 GHz and includes data associated with communication standards such as ANT, ANT+, Bluetooth™, Bluetooth™ low energy (BLE), the industrial, scientific, and medical (ISM) band at 2.4 GHz, or the like. In addition, or instead, the first electronic communication signal may include data that is associated with various Institute of Electrical and Electronics Engineers (IEEE) 802.11 Wi-Fi standards operating at 2.4 GHz. The first communication element 28 may decode data that has been received from an antenna electrically coupled thereto and encode data to be transmitted by the antenna electrically coupled thereto. As shown in FIG. 4, the first electronic communication signal may be communicated between the first communication element 28 and the third frequency band antenna 52.

The second communication element 30 may transmit and/or receive a second electronic communication signal with a frequency component having a center frequency of approximately 5 GHz and includes data associated with various IEEE 802.11 Wi-Fi standards operating at 5 GHz. The second communication element 30 may decode data that has been received from an antenna electrically coupled thereto and encode data to be transmitted by the antenna electrically coupled thereto. As shown in FIG. 4, the second electronic communication signal may be communicated between the second communication element 30 and the fourth frequency band antenna 54.

In other embodiments, the first communication element 28 or the second communication element 30 may be configured to process electronic signals that include data associated with cellular or mobile communication standards such as 2G, 3G, 4G, Voice over Internet Protocol (VoIP), LTE, Voice over LTE (VoLTE), or 5G.

Figure 5:
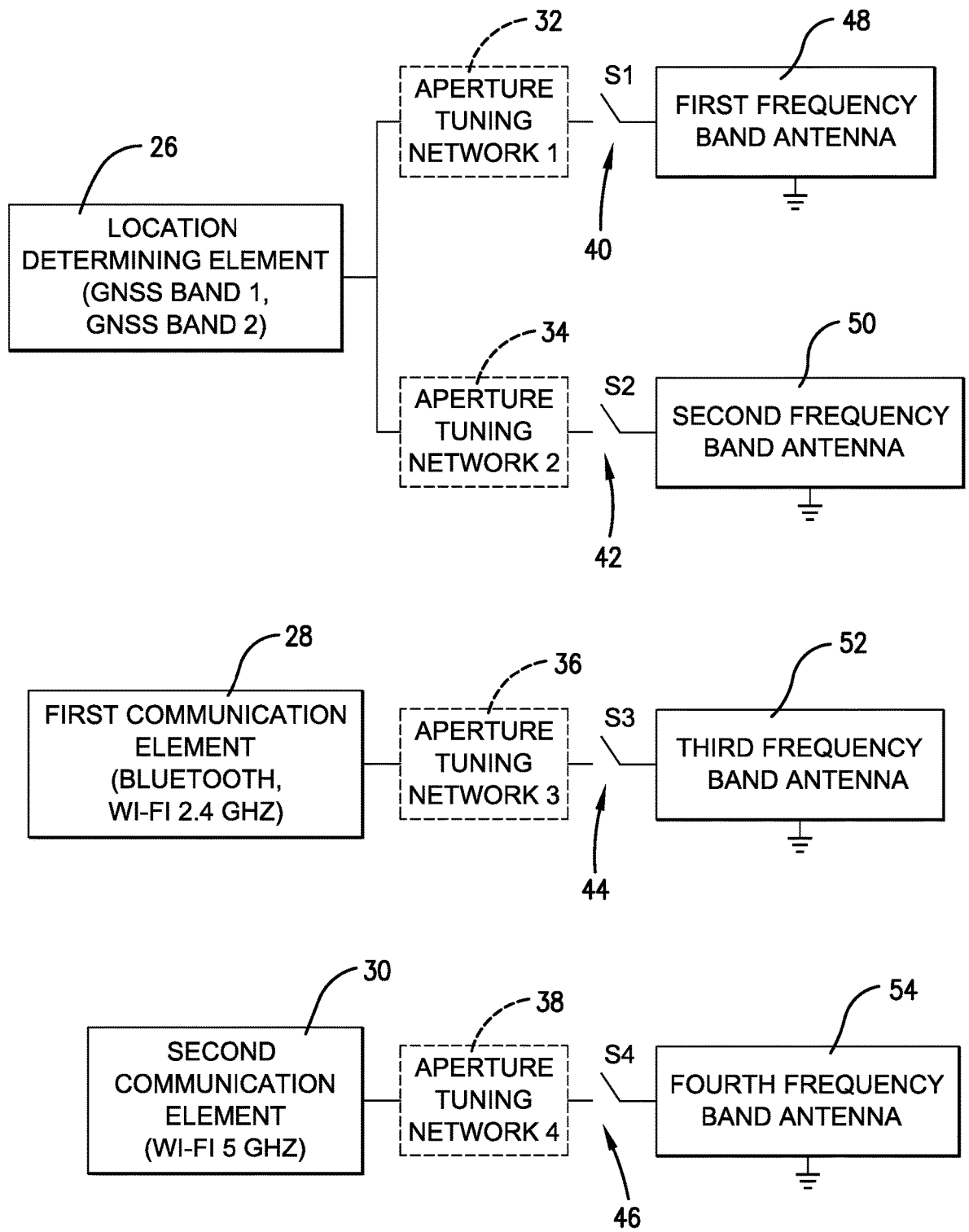
FIG. 5 is a schematic block diagram of a plurality of antennas and signal processing components.

Each aperture tuning network 32, 34, 36, 38 provides adjustment of a resonant frequency of a respective one of the antennas 48, 50, 52, 54. As shown in FIG. 5, a first aperture tuning network 32 may be configured or controlled to adjust a resonant frequency of the first frequency band antenna 48 (to receive location signals on a first GNSS band, such as the GPS L1 band), a second aperture tuning network 34 may be configured or controlled to adjust a resonant frequency of the second frequency band antenna 50 (to receive location signals on a first GNSS band, such as the GPS L5 band), a third aperture tuning network 36 may be configured or controlled to adjust a resonant frequency of the third frequency band antenna 52 (to transmit or receive communication signals at 2.4 GHz), a fourth aperture tuning network 38 may be configured or controlled to adjust a resonant frequency of the fourth frequency band antenna 54 (to transmit or receive communication signals at 5 GHz). Each aperture tuning network 32, 34, 36, 38 may include reactive components configured as L networks, T networks, Pi networks, combinations thereof and so forth. Exemplary embodiments of each aperture tuning network 32, 34, 36, 38 may include series-parallel combinations of a tunable capacitor, a capacitor, and an inductor. The components of each aperture tuning network 32, 34, 36, 38 may be formed from, or by, one or more conductive layers of the printed circuit board 22.

Each switch 40, 42, 44, 46 allows for a respective one of the antennas 48, 50, 52, 54 to be selected and electrically coupled with an associated location determining element 26, first communication element 28 or second communication element 30. In embodiments, engagement of each switch 40, 42, 44, 46 enables location signals or communication signals to pass through aperture tuning networks 32, 34, 36, 38 to be utilized through its associated antenna 48, 50, 52, 54. Each switch 40, 42, 44, 46 may be configured as a single-pole, single-throw (SPST) switch. As shown in FIG. 5, for each switch 40, 42, 44, 46, when it is closed, a signal path is formed between its associated antenna 48, 50, 52, 54, and an associated location determining element 26, first communication element 28 or second communication element 30. Similarly, when each switch 40, 42, 44, 46 is opened, signals do not pass between its associated antenna 48, 50, 52, 54, and an associated location determining element 26, first communication element 28 or second communication element 30.

Figure 7:
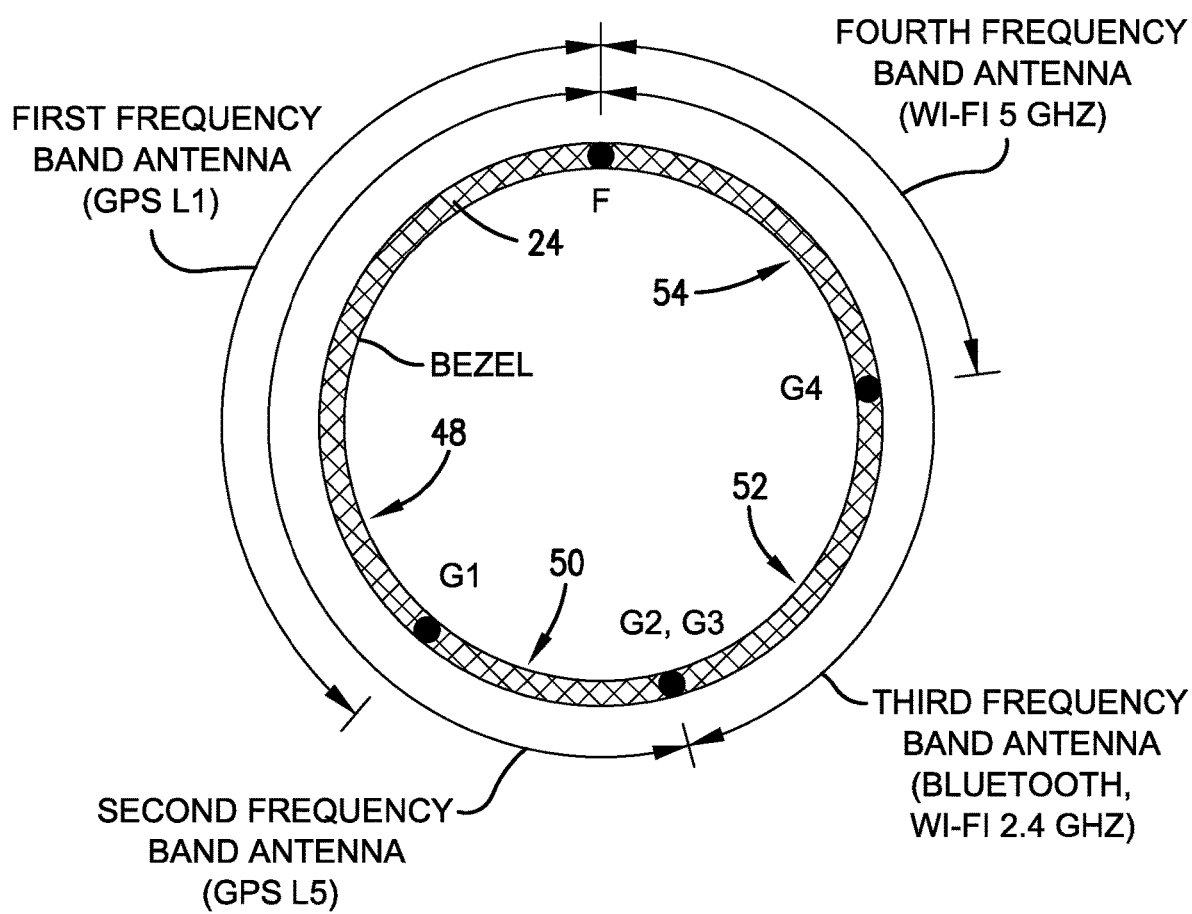
FIG. 7 is a schematic view of a second embodiment of the multiple frequency band antenna configuration, illustrating a portion of the circumference of the bezel occupied by each antenna.

Each of the antennas 48, 50, 52, 54 converts wireless RF electromagnetic radiation (a wireless signal) at a particular frequency, i.e., a resonant frequency, into a corresponding electronic signal and converts an electronic signal into a corresponding wireless signal. Each antenna 48, 50, 52, 54 includes an electronic signal feed point, a radiating element, and an electronic ground point. In embodiments, portions of bezel 24 form the radiating element of antennas 48, 50, 52, 54. For instance, a first portion of bezel 24 between a signal feed point and a first electronic ground point may form a radiating element for antenna 48. Similarly, a second portion of bezel 24 between a signal feed point, such as the signal feed point associated with antenna 48, and a second electronic ground point may form a radiating element for antenna 50. In some embodiments, the first portion of bezel 24 forming the radiating element for antenna 48 may partially overlap with the second portion of bezel 24 forming the radiating element for antenna 50. For instance, the first portion of bezel 24 associated with antenna 48 may extend between a signal feed point and a first electronic ground point and the second portion of bezel 24 associated with antenna 50 may extend between a signal feed point, which may be shared with antenna 48, and a second electronic ground point that is located at a different position on bezel 24 than the first electronic ground point. In embodiments where a signal feed point is shared by two antennas 48, 50, the first portion of bezel 24 associated with antenna 48 may be shorter than the second portion of bezel 24 associated with antenna 50 and overlap with the second portion of bezel 24, which includes a portion of bezel 24 that does not overlap with the first portion of bezel 24, as shown in FIG. 7.

One or more of antennas 48, 50, 52, 54, may be implemented as a loop antenna. Each antenna 48, 50, 52, 54 is formed to occupy a respective portion of a circumference of the bezel 24, wherein a length of the portion of the circumference varies according to a wavelength, or a fraction of a wavelength, such as a half-wavelength, of the frequency band wireless signal that is transmitted and/or received.

In a first embodiment, shown in FIGS. 6A-6C, electronic device 10 includes a bezel 24 including a first portion associated with a first frequency band antenna 48, a second portion associated with a second frequency band antenna 50, and an electrically grounded third portion isolating the first frequency band antenna 48 and the second frequency band antenna 50. Specifically, the first frequency band antenna 48 is partially formed by a first portion of the circumference of the bezel 24, including a first radiating element extending from the electronic signal feed point (F) to the first electronic ground point (G1). The second frequency band antenna 50 is partially formed by a second portion of the circumference of the bezel 24, including a second radiating element extending from the electronic signal feed point (F) to the second electronic ground point (G2). In order to ensure that the third portion of bezel 24 (or other portions of bezel 24 not associated with antennas 48, 50) do not radiate, the third portion of the bezel 24 is electrically coupled to at least one electronic ground at point (G). In some embodiments, a third portion of bezel 24 may not be utilized when the sum (combination) of the lengths of the first portion associated with a first frequency band antenna 48 and the second portion associated with a second frequency band antenna 50 may be approximately or substantially equal to the circumference of bezel 24.

The first frequency band antenna 48 is configured to receive a first frequency band of a GNSS signal, which in this exemplary embodiment is the GPS L1 band that has a center frequency of 1575.42 MHz. The length of the first portion of the circumference of the bezel 24 forming the radiating element for the first frequency band antenna 48 may be approximately one-half of the wavelength of the center frequency of the GPS L1 band. The second frequency band antenna 50 is configured to receive a second frequency band of a GNSS signal, which in this exemplary embodiment is the GPS L5 band that has a center frequency of 1176.45 MHz. The length of the second portion of the circumference of the bezel 24 forming the radiating element for the second frequency band antenna 50 may be approximately one-half of the wavelength of the center frequency of the GPS L5 band.

Figure 8:
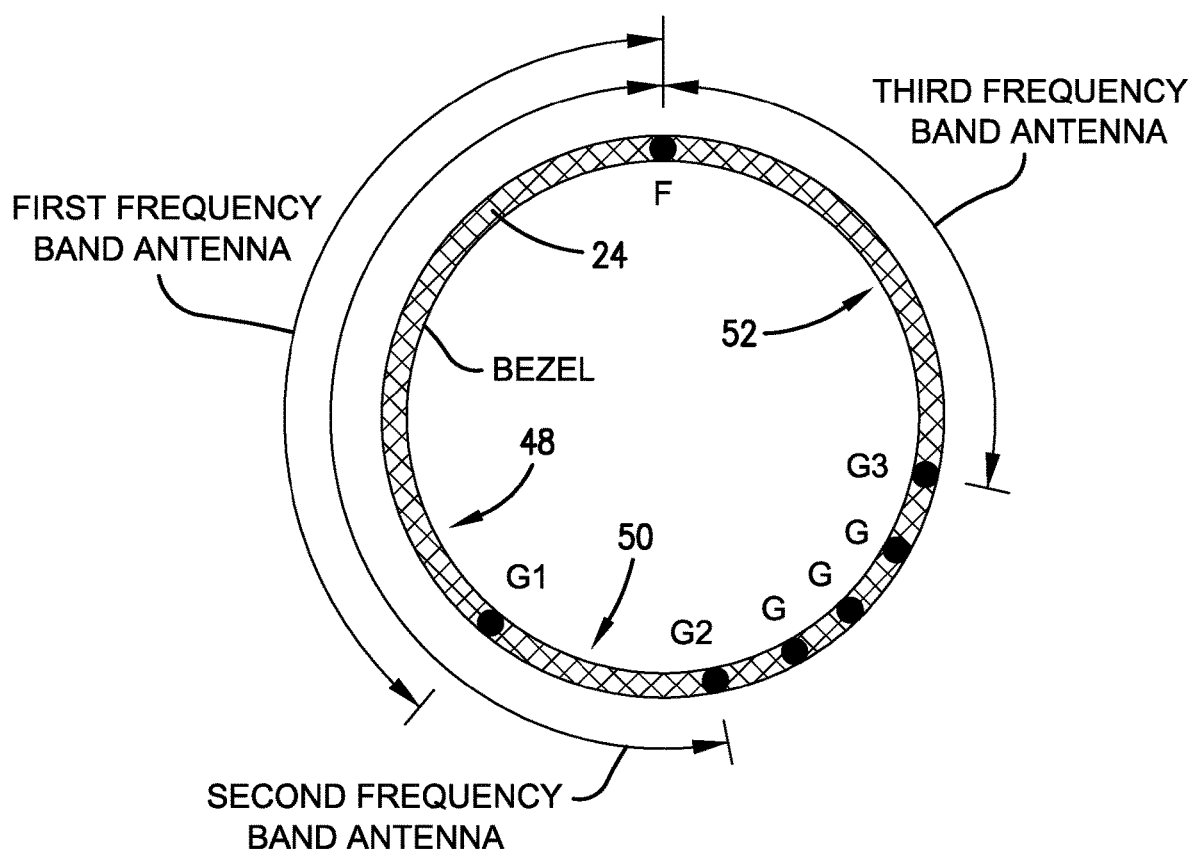
FIG. 8 is a schematic view of a third embodiment of the multiple frequency band antenna configuration, illustrating a portion of the circumference of the bezel occupied by each antenna.

In the depicted embodiments, the portions of bezel 24 associated with the first frequency band antenna 48 and the second frequency band antenna 50 are selected or positioned such that they do not overlap with (share the same portion of) the bezel 24 and the first frequency band antenna 48 and the second frequency band antenna 50 share the same electronic signal feed point (F) on the bezel 24. It is to be understood that, in other embodiments (as shown in FIGS. 7 and 8), a portion of the first frequency band antenna 48 may overlap with a portion of bezel 24 associated with the second frequency band antenna 50 and the first frequency band antenna 48 and the second frequency band antenna 50 may have separate electronic signal feed points on the bezel 24 that are electrically coupled with the location determining element 26 and a communication element 28, 30.

The first frequency band antenna 48 converts the GPS L1 band wireless signal, which is typically received in a direction towards an upper hemisphere of the earth (i.e., generally towards the sky), into the first electronic location signal that is communicated to the location determining element 26. Similarly, the second frequency band antenna 50 converts the GPS L5 band wireless signal, which is also typically received in a direction towards an upper hemisphere of the earth, into the second electronic location signal that is communicated to the location determining element 26. The first electronic location signal and the second electronic location signal are each communicated to the location determining element 26 though signal traces 70 formed on or within the printed circuit board 22, the electronic signal feed point (F) on the bezel 24, and one of the electrically conductive elements 64, thereby electrically coupling the electronic signal feed point (F) on the bezel 24 to the printed circuit board 22.

As shown in FIG. 6A, the bezel 24 may be substantially separated vertically into a left side and a right side such that the first frequency band antenna 48 is substantially positioned on the left side (a first portion of bezel 24) and the second frequency band antenna 50 is substantially positioned on the right side (a second portion of bezel 24). Similarly, as shown in FIGS. 6B and 6C, the bezel 24 may be substantially separated horizontally in to an upper half and a lower half. For instance, as shown in FIG. 6B, the first frequency band antenna 48 is substantially positioned on the upper half (a first portion of bezel 24) and the second frequency band antenna 50 is substantially positioned on the lower half (a second portion of bezel 24). As shown in FIG. 6C, the first frequency band antenna 48 is substantially positioned on the lower half (a first portion of bezel 24) and the second frequency band antenna 50 is substantially positioned on the upper half (a second portion of bezel 24). It is to be understood that the bezel 24 may be substantially separated into two or more portions at points other than as illustrated in FIGS. 6A-6C. Each configuration may impact a directionality of a radiation pattern associated with the first frequency band antenna 48 and the second frequency band antenna 50 and substantially correspond with a direction towards an upper hemisphere of the earth (i.e., generally towards the sky), which may be associated with a point located 180 degrees in a clockwise direction from a zero-degree point and associated with six o'clock (6:00) on a traditional watch dial (when positioned upright and viewing an opening of the bezel within which a display may be positioned) when worn by a user in running, cycling and other activities.

Electronic ground connections from the printed circuit board 22 to the first frequency band antenna 48 and the second frequency band antenna 50 may be made through the electronic ground points (G1), (G2) on the bezel 24, respectively, and an electrically conductive element 64 for each connection. In addition, one or more electronic ground connections for portions of the bezel 24 that are not associated with the first frequency band antenna 48 and the second frequency band antenna 50 may be made through the electronic ground point (G) on the bezel 24 and an of the electrically conductive element 64. Electrically grounding such portion(s) of bezel 24 (that are not forming a radiating element for an antenna) may electrically isolate the first frequency band antenna 48 and the second frequency band antenna 50.

In a second embodiment shown in FIG. 7, the first frequency band antenna 48 is partially formed by a first portion of the circumference of the bezel 24, including a radiating element of the first frequency band antenna 48 extending from the electronic signal feed point (F) to the first electronic ground point (G1). The second frequency band antenna 50 is partially formed by a second portion of the circumference of the bezel 24, including a radiating element of the second frequency band antenna 50 extending from the electronic signal feed point (F) to the second electronic ground point (G2). The third frequency band antenna 52 is partially formed by a third portion of the circumference of the bezel 24, including a radiating element of the third frequency band antenna 52 extending from the electronic signal feed point (F) to the third electronic ground point (G3). The fourth frequency band antenna 54 is partially formed by a fourth portion of the circumference of the bezel 24, including a radiating element of the fourth frequency band antenna 54 extending from the electronic signal feed point (F) to the fourth electronic ground point (G4).

The length of the bezel 24 forming radiating elements for the first and second frequency band antennas 48, 50 may correspond to a length enabling receipt of location signals output by satellite systems on the GPS L1 frequency band and the GPS L5 frequency band, respectively, as discussed above. The length of the first portion of the circumference of the bezel 24 partially forming the radiating element of the first frequency band antenna 48 may correspond to the half-wavelength of location signals output on the GPS L1 frequency band. Similarly, the length of the second portion of the circumference of the bezel 24 partially forming the second frequency band antenna 50 may correspond to the half-wavelength of location signals output on the GPS L5 frequency band.

The third frequency band antenna 52 may be configured to transmit and receive wireless signals having one or more frequencies in a frequency band ranging from approximately 2.40 GHz to approximately 2.4835 GHz and communicating data associated with communication standards such as Bluetooth™ and Wi-Fi. The length of the third portion of the circumference of the bezel 24 partially forming the third frequency band antenna 52 may correspond to the half-wavelength of the wireless signals output or received at approximately 2.4 GHz. Similarly, the fourth frequency band antenna 54 may be configured to transmit and receive wireless signals having one or more frequencies in a frequency band with a center frequency of approximately 5.5 GHz (between 4915 and 5875 MHz) and communicating data associated with communication standards such as Wi-Fi. The length of the fourth portion of the circumference of the bezel 24 partially forming the fourth frequency band antenna 54 may correspond to the half-wavelength of wireless signals output or received at approximately 5.5 GHz.

As shown in FIG. 7, portions of bezel 24 may form a radiating element for antennas 48, 50, 52, 54 such that the radiating element for the first frequency band antenna 48 formed by the first portion of bezel 24 partially overlaps with the radiating element for the second frequency band antenna 50 formed by the second portion of bezel 24. Similarly, the radiating element for the fourth frequency band antenna 54 formed by the fourth portion of bezel 24 partially overlaps with the radiating element for the third frequency band antenna 52 formed by the third portion of bezel 24. In other embodiments, other combinations of antennas 48, 50, 52, 54 may share portions of the bezel 24. It is to be understood that although the antennas 48, 50, 52, 54 all share the same electronic signal feed point (F) on the bezel 24 in this embodiment, each antenna 48, 50, 52, 54 may have a separate electronic signal feed point of the bezel 24 in other embodiments.

As discussed above, the first frequency band antenna 48 converts the received GPS L1 band wireless signal into the first electronic location signal and the second frequency band antenna 50 converts the received GPS L5 band wireless signal into the second electronic location signal, with each of the signals being communicated to the location determining element 26. Similarly, the third frequency band antenna 52 converts the received 2.4 GHz wireless signal into the first electronic communication signal. For transmission (output) of the first electronic communication signal, the third frequency band antenna 52 converts the first electronic communication signal into the 2.4 GHz wireless signal. The fourth frequency band antenna 54 converts the received 5 GHz wireless signal into the second electronic communication signal. For transmission (output) of the second electronic communication signal, the fourth frequency band antenna 54 converts the second electronic communication signal into the 5 GHz wireless signal.

The first electronic location signal and the second electronic location signal are each communicated from the electronic signal feed point (F) on the bezel 24 to the location determining element 26 on the printed circuit board 22 through the electrically conductive element 64 or other connector positioned along side wall 60 that electrically couples the location determining element 26 with antennas 48, 50 through signal traces 70. In embodiments where the electronic signal feed point (F) on the bezel 24 is shared by antennas 48, 50, 52, 54, the first electronic communication signal and the second electronic communication signal are each communicated from the electronic signal feed point (F) on the bezel 24 to the first communication element 28 and the second communication element 30, respectively, through the electrically conductive element 64 or other connector positioned along side wall 60. In such embodiments, where each of the electronic signals communicated to the antennas 48, 50, 52, 54 is fed through the same electronic signal feed point (F), the electronic signals are also communicated through the same electrically conductive element 64, as shown in FIG. 3. In embodiments where the electronic signal feed point (F) on the bezel 24 is not shared by antennas 48, 50, 52, 54, the first electronic communication signal and the second electronic communication signal are each communicated from the electronic signal feed point (F) on the bezel 24 to the first communication element 28 and the second communication element 30, respectively, through a second electrically conductive element 64, a third electrically conductive element 64, or other connector positioned along side wall 60, and one or more signal traces 70.

Returning to FIG. 7, the electronic ground connections from the bezel 24 to the printed circuit board 22 may be made through the electronic ground points (G1), (G2), (G3), (G4) on a lower surface of bezel 24 and through one electrically conductive element 64 for each connection. In embodiments, electronic ground points (G2) and (G3) may share the same point on the lower surface of bezel 24.

In a third embodiment shown in FIG. 8, bezel 24 may include portions forming radiating elements for the first frequency band antenna 48, the second frequency band antenna 50, and the third frequency band antenna 52 that may each transmit and/or receive various signals on different frequency bands. The bezel 24 may include portions that are not associated with an antenna and these portions may be grounded to electrically isolate adjacent portions of bezel 24 that form radiating elements for one or more antennas 48, 50, 52. The first frequency band antenna 48 is partially formed by a first portion of the circumference of the bezel 24, including a first radiating element extending from the electronic signal feed point (F) to the first electronic ground point (G1). The second frequency band antenna 50 is partially formed by a second portion of the circumference of the bezel 24, including a second radiating element extending from the electronic signal feed point (F) to the second electronic ground point (G2) such that a portion of the second radiating element overlap with (is shared by) the first radiating element associated with the first frequency band antenna 48. The third frequency band antenna 52 is partially formed by a third portion of the circumference of the bezel 24, including a third radiating element extending from the electronic signal feed point (F) to the third electronic ground point (G3) such that the third radiating element does not overlap with the first or second radiating elements (with the exception of the shared electronic signal feed point (F)). A fourth portion of bezel 24 extending between the electronic ground point (G2) and the electronic ground point (G3) is not associated with the first, second or third frequency antennas 48, 50, 52. In order to reduce or minimize radiation of this fourth portion of bezel 24, this fourth portion of the bezel 24 is electrically coupled to electronic ground at a plurality of electronic ground points (G). The plurality of electronic ground points (G) may be separated (radially along bezel 24) from one another along the lower surface of bezel 24 by a uniform length (circumference or by a uniform angular value) or by non-uniform (different) lengths along the bezel 24. The electronic ground points (G) may electrically couple the fourth portion of bezel 24 to the electrical ground of printed circuit board 22 though one or more electrically conductive element 64 for each electronic ground point (G).

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. A wrist-worn electronic device comprising:
   a housing including a bottom wall configured to contact a wearer's wrist and a side wall coupled to the bottom wall;
   an annular bezel formed at least partially from electrically conductive material and positioned along an upper edge of the side wall;
   a first frequency band antenna configured to receive a first global navigation satellite system (GNSS) location signal at a first frequency, the first frequency band antenna including a radiating element formed by a first portion of a circumference of the bezel;
   a second frequency band antenna configured to receive a second GNSS location signal at a second frequency, the second frequency band antenna including a radiating element formed by a second portion of the circumference of the bezel;
   a location determining element electrically coupled with the first frequency band antenna and the second frequency band antenna, the location determining element configured to receive the first and second GNSS location signals and determine a current geolocation of the wrist-worn electronic device based on the first and second GNSS location signals;
   a third frequency band antenna configured to transmit or receive a first communication protocol wireless signal at a third frequency, the third frequency band antenna including a radiating element formed by a third portion of the circumference of the bezel;
   a fourth frequency band antenna configured to transmit or receive a second communication protocol wireless signal at a fourth frequency, the fourth frequency band antenna including a radiating element formed by a fourth portion of the circumference of the bezel; and
   a communication element electrically coupled with the third frequency band antenna and the fourth frequency band antenna, the communication element configured to receive or output at least one of the first communication protocol wireless signal and the second communication protocol wireless signal.

2. The wrist-worn electronic device of claim 1, wherein the second portion of the circumference of the bezel is shared with a portion of the first portion of a circumference of the bezel.

3. The wrist-worn electronic device of claim 1, wherein the fourth portion of the circumference of the bezel is shared with a portion of the third portion of a circumference of the bezel.

4. The wrist-worn electronic device of claim 1, wherein each of the first frequency band antenna, the second frequency band antenna, the third frequency band antenna and the fourth frequency band antenna is a loop antenna.

5. The wrist-worn electronic device of claim 1, wherein—
   the radiating element of the first frequency band antenna extends between an electronic signal feed connection positioned at a first point on a lower surface of the bezel and a first electronic ground connection positioned at a second point on the lower surface of the bezel, and the radiating element of the second frequency band antenna extends between the electronic signal feed connection and a second electronic ground connection positioned at a third point on the lower surface of the bezel;

wherein the electronic signal feed connection is shared by the first frequency band antenna and the second frequency band antenna.

6. The wrist-worn electronic device of claim 5, wherein— the radiating element of the third frequency band antenna extends between the electronic signal feed connection positioned at the first point on a lower surface of the bezel and a third electronic ground connection positioned at a fourth point on the lower surface of the bezel, and the radiating element of the fourth frequency band antenna extends between the electronic signal feed connection and a fourth electronic ground connection positioned at a fifth point on the lower surface of the bezel;

wherein the electronic signal feed connection is shared by the first frequency band antenna, the second frequency band antenna, the third frequency band antenna and the fourth frequency band antenna.

7. The wrist-worn electronic device of claim 6, further comprising a printed circuit board retaining the location determining element and the communication element, wherein the electronic signal feed connection electrically couples the location determining element with the first frequency band antenna and the second frequency band antenna, and wherein the electronic signal feed connection electrically couples the communication element with the third frequency band antenna and the fourth frequency band antenna.

8. The wrist-worn electronic device of claim 7, further comprising a plurality of electronic ground connections coupled to and positioned between the printed circuit board and the second point on the lower surface of the bezel, the third point on the lower surface of the bezel, the fourth point on the lower surface of the bezel and the fifth point on the lower surface of the bezel.

9. The wrist-worn electronic device of claim 1, wherein the first GNSS location signal is a global positioning satellite (GPS) L1 band signal and the first frequency is 1575 megahertz (MHz), wherein the second GNSS location signal is a GPS L5 band signal and the second frequency is 1176 MHz, wherein the first communication protocol wireless signal is 2.4 gigahertz (GHz) and wherein the second communication protocol wireless signal is 5 GHz.

10. The wrist-worn electronic device of claim 1, wherein the sum of a length of the second portion of the circumference of the bezel and a length of the third portion of the circumference of the bezel is substantially equal to a circumference of the bezel.

11. A wrist-worn electronic device comprising:

a housing including a bottom wall configured to contact a wearer's wrist and a side wall coupled to the bottom wall;

an annular bezel formed at least partially from electrically conductive material and positioned along an upper edge of the side wall;

a first frequency band antenna configured to receive a first global navigation satellite system (GNSS) location signal at a first frequency, the first frequency band antenna including a radiating element formed by a first portion of a circumference of the bezel;

a second frequency band antenna configured to receive a second GNSS location signal at a second frequency, the second frequency band antenna including a radiating element formed by a second portion of the circumference of the bezel, the second portion of the circumference of the bezel shared with a portion of the first portion of a circumference of the bezel;

a location determining element electrically coupled with the first frequency band antenna and the second frequency band antenna, the location determining element configured to receive the first and second GNSS location signals and determine a current geolocation of the wrist-worn electronic device based on the first and second GNSS location signals;

a third frequency band antenna configured to transmit or receive a first communication protocol wireless signal at a third frequency, the third frequency band antenna including a radiating element formed by a third portion of the circumference of the bezel;

a fourth frequency band antenna configured to transmit or receive a second communication protocol wireless signal at a fourth frequency, the fourth frequency band antenna including a radiating element formed by a fourth portion of the circumference of the bezel, the fourth portion of the circumference of the bezel shared with a portion of the third portion of a circumference of the bezel; and a communication element electrically coupled with the third frequency band antenna and the fourth frequency band antenna, the communication element configured to receive or output at least one of the first communication protocol wireless signal and the second communication protocol wireless signal.

12. The wrist-worn electronic device of claim 11, wherein— the radiating element of the first frequency band antenna extends between a first electronic signal feed connection positioned at a first point on a lower surface of the bezel and a first electronic ground connection positioned at a second point on the lower surface of the bezel, and the radiating element of the second frequency band antenna extends between the first electronic signal feed connection and a second electronic ground connection positioned at a third point on the lower surface of the bezel;

wherein the first electronic signal feed connection is shared by the first frequency band antenna and the second frequency band antenna.

13. The wrist-worn electronic device of claim 12, wherein— the radiating element of the third frequency band antenna extends between a second electronic signal feed connection positioned at the fourth point on a lower surface of the bezel and a third electronic ground connection positioned at a fifth point on the lower surface of the bezel, and the radiating element of the fourth frequency band antenna extends between the second electronic signal feed connection and a fourth electronic ground connection positioned at a sixth point on the lower surface of the bezel;

wherein the second electronic signal feed connection is shared by the third frequency band antenna and the fourth frequency band antenna.

14. The wrist-worn electronic device of claim 13, further comprising a printed circuit board retaining the location determining element and the communication element, wherein the first electronic signal feed connection electrically couples the location determining element with the first frequency band antenna and the second frequency band antenna, and wherein the second electronic signal feed connection electrically couples the communication element with the third frequency band antenna and the fourth frequency band antenna.

15. The wrist-worn electronic device of claim 14, further comprising a plurality of electronic ground connections coupled to and positioned between the printed circuit board and the second point on the lower surface of the bezel, the third point on the lower surface of the bezel, the fifth point on the lower surface of the bezel and the sixth point on the lower surface of the bezel.

16. The wrist-worn electronic device of claim 11, wherein each of the first frequency band antenna, the second frequency band antenna, the third frequency band antenna and the fourth frequency band antenna is a loop antenna.

17. The wrist-worn electronic device of claim 11, wherein the first GNSS location signal is a global positioning satellite (GPS) L1 band signal and the first frequency is 1575 megahertz (MHz), wherein the second GNSS location signal is a GPS L5 band signal and the second frequency is 1176 MHz, wherein the first communication protocol wireless signal is 2.4 gigahertz (GHz) and wherein the second communication protocol wireless signal is 5 GHz.

18. The wrist-worn electronic device of claim 11, wherein the sum of a length of the second portion of the circumference of the bezel and a length of the third portion of the circumference of the bezel is substantially equal to a circumference of the bezel.

19. A wrist-worn electronic device comprising:
  a housing including a bottom wall configured to contact a wearer's wrist and a side wall coupled to the bottom wall;
  an annular bezel having a circumference and formed at least partially from electrically conductive material and positioned along an upper edge of the side wall;
  a first frequency band antenna configured to receive a first global navigation satellite system (GNSS) location signal at a first frequency, the first frequency band antenna including a radiating element formed by a first portion of a circumference of the bezel;
  a second frequency band antenna configured to receive a second GNSS location signal at a second frequency, the second frequency band antenna including a radiating element formed by a second portion of the circumference of the bezel, the second portion of the circumference of the bezel shared with a portion of the first portion of a circumference of the bezel;
  a location determining element electrically coupled with the first frequency band antenna and the second frequency band antenna, the location determining element configured to receive the first and second GNSS location signals and determine a current geolocation of the wrist-worn electronic device based on the first and second GNSS location signals;
  a third frequency band antenna configured to transmit or receive a first communication protocol wireless signal at a third frequency, the third frequency band antenna including a radiating element formed by a third portion of the circumference of the bezel;
  a fourth frequency band antenna configured to transmit or receive a second communication protocol wireless signal at a fourth frequency, the fourth frequency band antenna including a radiating element formed by a fourth portion of the circumference of the bezel, the fourth portion of the circumference of the bezel shared with a portion of the third portion of a circumference of the bezel; and
  a communication element electrically coupled with the third frequency band antenna and the fourth frequency band antenna, the communication element configured to receive or output at least one of the first communication protocol wireless signal and the second communication protocol wireless signal;
  wherein the sum of a length of the second portion of the circumference of the bezel and a length of the third portion of the circumference of the bezel is substantially equal to a circumference of the bezel.

20. The wrist-worn electronic device of claim 19, wherein the first GNSS location signal is a global positioning satellite (GPS) L1 band signal and the first frequency is 1575 megahertz (MHz), wherein the second GNSS location signal is a GPS L5 band signal and the second frequency is 1176 MHz, wherein the first communication protocol wireless signal is 2.4 gigahertz (GHz) and wherein the second communication protocol wireless signal is 5 GHz.

* * * * *